UNITED STATES PATENT OFFICE.

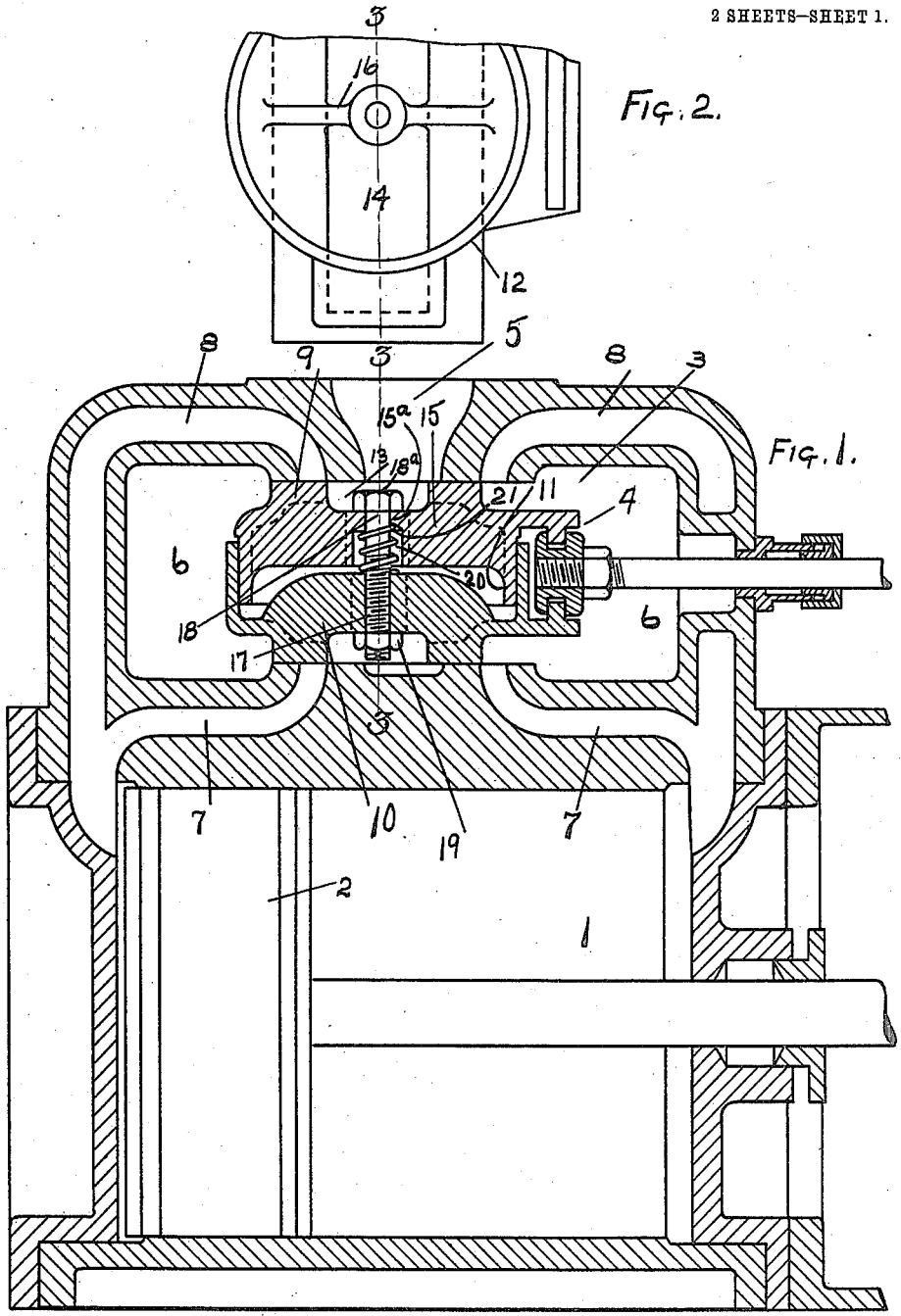

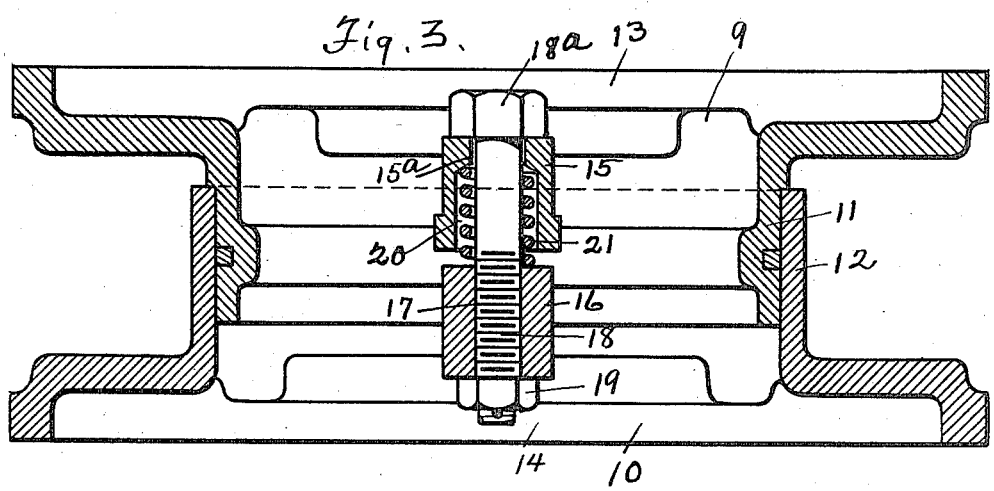

FRANK H. BALL AND FREDERICK O. BALL, OF PLAINFIELD, NEW JERSEY.

STEAM-ENGINE VALVE.

1,059,922.  Specification of Letters Patent.  Patented Apr. 22, 1913.

Application filed July 6, 1911. Serial No. 637,076.

*To all whom it may concern:*

Be it known that we, FRANK H. BALL and FREDERICK O. BALL, citizens of the United States, residing at Plainfield, in the county of Union and State of New Jersey, have invented new and useful Improvements in Steam-Engine Valves, of which the following is a specification.

This invention relates to steam engine valves, and consists in certain improvements in the construction thereof as will be hereinafter fully described and pointed out in the claims.

In the use of balanced valves formed of telescoping parts, it has been customary to give a slight preponderance to the areas tending to separate the valves so as to assure a proper seating of the surfaces of the valves in the operation of the engine. As steam pressures are increased, the pressure incident to this difference of area tends to increase the unbalanced condition of the valve and in some pressures to an extent to interfere with a desirable operation of the governor. The difficulty arising from the increase in pressure is not only due to the increase in the unbalanced condition of the valve, but also to the greater difficulty of properly lubricating the parts.

The object of the invention is to provide a valve of this type with means for preventing an undue pressure on the valve surfaces, and at the same time for assuring a proper closure of the valve.

The invention is illustrated in the accompanying drawings as follows:

Figure 1 shows a central section through the engine, steam chest and valve. Fig. 2 a fragment of a plan view of the lower part of the valve. Fig. 3 is a section on the line 3—3 in Figs. 1 and 2.

1 marks the cylinder, 2 the piston, 3 the valve chest. Steam is admitted to the center of the chest at 5 and exhausts at the ends 6 of the chest. The double ported arrangement 7 and 8 is provided, the port 7 leading from one face of the chest and the port 8 leading from the other face of the chest. The valve is formed of the two parts 9 and 10. These have the cylindrically shaped telescoping walls 11 and 12. The steam enters from the admission port 5 to the passage 13 in the valve. The passage 13 opens into the space inclosed by the walls 11 and 12. The valve passage 14 opens from the space opposite the passage 13. The passage 13 operates on the ports 8 and the passage 14 on the ports 7. These parts are not new but are in accordance with the type of valve now in use.

Arranged across the passage 13 is a cross bar 15 and a similar cross bar 16 is arranged across the passage 14. The cross bar 15 is provided with a perforation $15^a$ preferably directly at the center of the valve. The cross bar 16 has a screw threaded perforation at 17 also at the center of the valve. A screw bolt 18 extends through the perforation $15^a$ and is screwed into the perforation 17. A lock nut 19 is provided for locking the screw in adjustment. A socket 20 is arranged in the lower face of the cross bar 15, surrounding the bolt and a spring 21 is arranged around the bolt in this socket and is tensioned against the two cross bars and tends to separate the parts of the valve.

The screw bolt 18 is provided with a very fine pitch so that a very fine adjustment may be had. The head $18^a$ of the screw operating on the cross bar 15 limits the separation of the parts. By adjusting this screw, the separation may be so limited as to permit of a perfect seating of the valve and at the same time, the screw relieves the valve surfaces of pressure incident to an unbalanced condition of the valve. The spring assures the seating of the valve initially. With the steam areas so arranged, there is a preponderance of steam pressure which tends to separate the parts. After the initial adjustment of this valve, it automatically maintains this adjustment. If the adjustment is such that the screw is slightly too loose so that there is too great a pressure on the valve surfaces, the result is that these valve surfaces wear until the pressure is taken up by the screw. There is also a slight telescopic action of the valve parts incident to the variations of pressure upon it, especially upon different parts of the valve in operation. This is particularly true, if the valve surfaces do not perfectly seat. By reason of this action of the parts if the screw is so tight as to prevent a perfect seating of the valve surfaces, there will be an excessive wear on the head $18^a$ of the screw so that it will allow such a separation as to afford a perfect seating of the valve.

What we claim as new is:

1. A steam engine valve formed of parts having cylindrically shaped telescoping walls and arranged to admit steam within the said walls and to deliver steam from both sides of the valve; and a screw arranged within the walls and operating upon said parts for limiting the separating movement of the parts.

2. A steam engine valve comprising the parts 9 and 10 having the central valve passages 13 and 14 in the valve faces; the cylindrically shaped telescoping walls 11 and 12; the cross bars 15 and 16 having perforations at their centers; the screw 18 extending from one bar and screwed into the other; and a spring arranged around the screw and tensioned against the bars.

In testimony whereof we have hereunto set our hands in the presence of two subscribing witnesses.

FRANK H. BALL.
FREDERICK O. BALL.

Witnesses:
A. K. SMITH,
ANNA H. BURKETT.

Copies of this patent may be obtained for five cents each, by addressing the "Commissioner of Patents, Washington, D. C."